US012604792B2

(12) United States Patent
Bassett

(10) Patent No.: US 12,604,792 B2
(45) Date of Patent: Apr. 21, 2026

(54) SEED METER WITH VACUUM PRODUCING DEVICE AND CONTROLLED OUTLET PRESSURE

(71) Applicant: Deere & Company, Moline, IL (US)

(72) Inventor: Joseph D. Bassett, Sycamore, IL (US)

(73) Assignee: Deere & Company, Moline, IL (US)

( * ) Notice: Subject to any disclaimer, the term of this patent is extended or adjusted under 35 U.S.C. 154(b) by 385 days.

(21) Appl. No.: 18/260,193

(22) PCT Filed: Dec. 28, 2021

(86) PCT No.: PCT/US2021/065403
§ 371 (c)(1),
(2) Date: Jun. 30, 2023

(87) PCT Pub. No.: WO2022/147050
PCT Pub. Date: Jul. 7, 2022

(65) Prior Publication Data
US 2024/0057514 A1     Feb. 22, 2024

Related U.S. Application Data

(60) Provisional application No. 63/132,279, filed on Dec. 30, 2020.

(51) Int. Cl.
*A01C 7/04*          (2006.01)
*A01C 7/08*          (2006.01)
(Continued)

(52) U.S. Cl.
CPC ........... *A01C 7/046* (2013.01); *A01C 7/0445* (2023.05); *A01C 7/082* (2013.01); *A01C 7/084* (2013.01);
(Continued)

(58) Field of Classification Search
CPC ....... A01C 7/046; A01C 7/0445; A01C 7/082; A01C 7/084; A01C 7/105; A01C 7/121; A01C 7/0443
See application file for complete search history.

(56) References Cited

U.S. PATENT DOCUMENTS 3,944,137 A     3/1976 Cutchins
8,443,742 B2 *  5/2013 Orrenius ................ A01C 7/081
                                                     111/179
(Continued)

FOREIGN PATENT DOCUMENTS

DE     102017109042 A1   10/2018
EP          3125669 B1    7/2018
WO     2024194073 A1      9/2024

OTHER PUBLICATIONS

Extended European Search Report and Written Opinion issued in European Patent Application No. 21916375.5 dated Nov. 13, 2024, in 11 pages.
(Continued)

*Primary Examiner* — Jamie L McGowan
(74) *Attorney, Agent, or Firm* — ICE MILLER LLP; Justin D. Swindells

(57)          ABSTRACT

A seed meter for agricultural planters is provided. The seed meter includes a seed disk provided in a seed disk housing. The seed meter includes a vacuum producing device configured to generate a vacuum pressure in the seed disk housing for loading seed onto the seed disk. The seed meter includes an outlet coupled to the seed disk housing. The outlet has an outlet pressure for ejecting the loaded seed from the seed meter. An advantage of such a seed meter is not having to change the seed disk between different types of seeds. Another advantage includes being able to control the output pressure and the vacuum pressure.

17 Claims, 12 Drawing Sheets

(51) Int. Cl.
A01C 7/10 (2006.01)
A01C 7/12 (2006.01)
(52) U.S. Cl.
CPC .............. A01C 7/105 (2013.01); A01C 7/121 (2013.01); *A01C 7/0443* (2023.05)

(56) References Cited

U.S. PATENT DOCUMENTS

| | | | | |
|---|---|---|---|---|
| 9,426,940 | B2 * | 8/2016 | Connors | ................. A01C 7/046 |
| 10,980,167 | B2 * | 4/2021 | Wang | ..................... A01C 7/102 |
| 11,770,997 | B2 * | 10/2023 | Garner | ................... A01C 7/046 |
| | | | | 111/185 |
| 2006/0266269 | A1 | 11/2006 | Eben | |
| 2010/0224110 | A1 * | 9/2010 | Mariman | ............. A01C 7/0443 |
| | | | | 111/11 |
| 2010/0282145 | A1 | 11/2010 | Preheim et al. | |
| 2010/0313801 | A1 * | 12/2010 | Peterson | ................ A01C 7/081 |
| | | | | 700/231 |
| 2015/0189826 | A1 | 7/2015 | Wilhelmi et al. | |
| 2016/0007523 | A1 | 1/2016 | Rylander | |
| 2016/0165794 | A1 * | 6/2016 | Czapka | ................. A01C 19/02 |
| | | | | 111/185 |
| 2016/0366814 | A1 | 12/2016 | Roszman | |
| 2017/0086351 | A1 | 3/2017 | Garner | |
| 2018/0000009 | A1 | 1/2018 | Baitinger | |
| 2018/0153092 | A1 * | 6/2018 | Moorehead | ............ A01C 7/102 |
| 2018/0153096 | A1 * | 6/2018 | Garner | ................... A01C 7/046 |
| 2018/0310468 | A1 * | 11/2018 | Schoeny | ............... A01C 7/206 |
| 2018/0325017 | A1 * | 11/2018 | Schoeny | ............... A01C 7/105 |
| 2019/0195677 | A1 | 6/2019 | Schoeny | |
| 2019/0387663 | A1 * | 12/2019 | Wang | ..................... A01C 7/082 |
| 2020/0037519 | A1 * | 2/2020 | Wonderlich | .......... B05B 12/085 |
| 2021/0007272 | A1 * | 1/2021 | Schoeny | ............... A01C 7/081 |

OTHER PUBLICATIONS

International Preliminary Report on Patentability for International Application No. PCT/US2021/065403, dated Jul. 13, 2023, 09 Pages.

International Search Report and Written Opinion for International Application No. PCT/US2021/065403, dated Mar. 22, 2022, 11 Pages.

International Search Report and Written Opinion for PCT/US2024/037443 mailed Dec. 19, 2024.

* cited by examiner

300

314

312

404

302

306

304

308   308

406

408

402

300

404

314

316

306
308
308

304

302

314

310

302

304

408

316

406

300

1504

406

1502

1502

402

1106

310

SEED METER WITH VACUUM PRODUCING DEVICE AND CONTROLLED OUTLET PRESSURE

CROSS-REFERENCE TO RELATED APPLICATIONS

This application is a 371 national phase application of International Application No. PCT/US2021/065403, filed on Dec. 28, 2021, which published in the English language on Jul. 7, 2022, under International Publication No. WO/2022/147050 which claims the benefit of and priority to U.S. Provisional Patent Application No. 63/132,279, filed Dec. 30, 2020, which is hereby incorporated by reference herein in its entirety.

TECHNICAL FIELD

The present disclosure relates generally to agricultural equipment, and more specifically, to agricultural planters with seed meters having a vacuum producing device for loading seeds and an outlet pressure for directing the seeds to the soil.

BACKGROUND

Agricultural planters typically have seeders that use positive air pressure to push or load seeds onto a seed disk. Additionally, the same positive pressure that is used to load the seeds onto the seed disk is then used to dislodge or eject the seeds into a seed outlet for directing the seed to a specific area in the furrow. In seeders where positive air pressure is used to direct seeds to the furrow, the seeds usually travel at a relatively high speed when compared to vacuum seeders. The high speed can cause seeds to bounce after hitting the furrow, thus resulting in non-ideal or non-uniform placement of seed on farmland.

Vacuum seeders usually struggle in creating enough vacuum for loading seeds onto seed disks since vacuum seeders share a same vacuum producing device across multiple seeders. Since vacuum is shared across multiple seeders, the vacuum should be generated over a large distance. Vacuum seeders also rely on gravity when directing seeds to the furrow which can result in imprecise seed placement. The present disclosure is directed to solving problems related to vacuum seeders.

SUMMARY

Since vacuum seeders typically struggle to create more vacuum for use with large seed disks, embodiments of the present disclosure provide seed meters for use in planters where each seed meter includes a vacuum producing device. By having a vacuum producing device on each seed meter, vacuum is not shared between multiple seed meters, thus there is no need to convey vacuum over a large distance. With such a design, larger seed disks can be used. Embodiments of the present disclosure offer simplicity in design with fewer wear components compared to conventional seeders.

Some embodiments of the present disclosure provide a seed meter. The seed meter includes a seed disk provided in a seed disk housing. The seed meter further includes a vacuum producing device and an outlet. The vacuum producing device is configured to generate a vacuum pressure in the seed disk housing for loading seed onto the seed disk.

The outlet is coupled to the seed disk housing and has an outlet pressure for ejecting the loaded seed from the seed meter.

Two or more seed meters provided in accordance with some embodiments of the present disclosure can be mounted on an agricultural planter. Each of the two or more seed meters being mounted on a row of the planter.

BRIEF DESCRIPTION OF THE DRAWINGS

The foregoing and other advantages of the present disclosure will become apparent upon reading the following detailed description and upon reference to the drawings.

Figure 1:
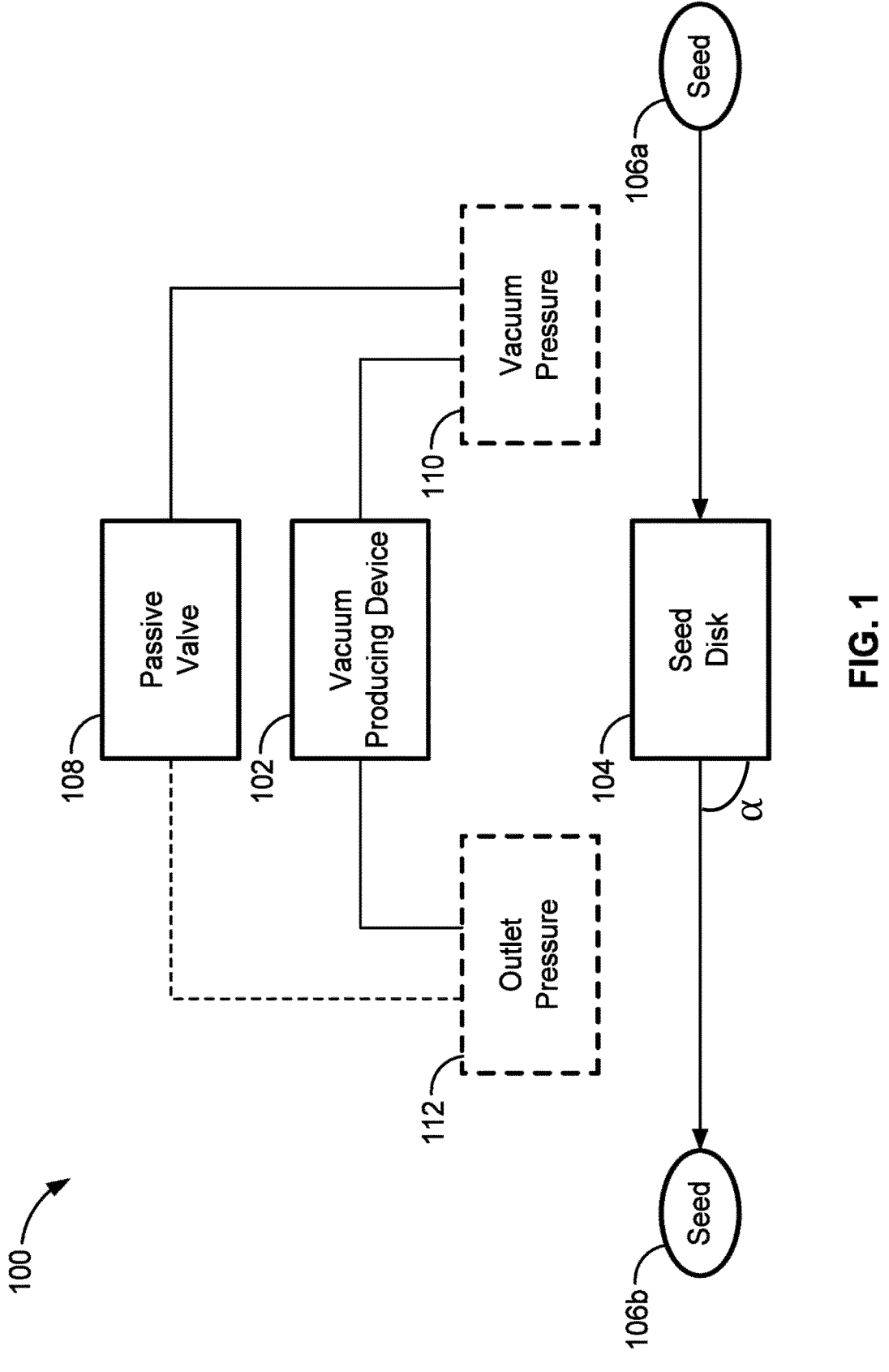
FIG. 1 illustrates a block diagram of a first seed meter, according to some implementations of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

FIG. 1 illustrates a block diagram of a first seed meter 100, according to some implementations of the present disclosure. The seed meter 100 includes a vacuum producing device 102, a seed disk 104, and a passive valve 108. The seed meter 100 receives a seed at an input side and expels the seed from an output side. In FIG. 1, seed 106a represents the received seed at the input side, and seed 106b represents the expelled seed from the output side. The vacuum producing device 102 generates a vacuum pressure 110 at the input side of the seed meter 100. The vacuum pressure 110 facilitates loading the seed on the seed disk 104.

The vacuum producing device 102 can include an impeller and a servo or motor for controlling the rotational speed of the impeller. The seed disk 104 includes a flat surface with holes such that the vacuum pressure 110 generated at the input side of the seed meter 100 by the vacuum producing device 102 loads the seed into one of the holes of the seed disk 104. An actuator rotates the seed disk 104, and the vacuum pressure 110 prevents the seed from dislodging from the hole of the seed disk 104. The seed disk 104 rotates such that when the seed lodged in the hole of the seed disk 104 reaches a certain location within the seed meter 100, the seed experiences a pulling force from the outlet pressure 112. The pulling force dislodges the seed from the hole of the seed disk 104, and as the seed travels a distance, the pulling force becomes a pushing force such that the outlet pressure 112 pushes the dislodged seed towards the soil.

The passive valve 108 can be used to relate the vacuum pressure 110 generated by the vacuum producing device 102 to the outlet pressure 112. FIG. 1 shows that the outlet pressure 112 is generated by the vacuum producing device 102 as well. In some implementations, the generation of the vacuum pressure 110 and the outlet pressure 112 can be accomplished by two different devices and not just the vacuum producing device 102. The passive valve 108 relates the vacuum pressure 110 to the outlet pressure 112 such that the higher the vacuum pressure 110, the higher the outlet pressure 112. The vacuum pressure 110 is a negative air pressure, and the outlet pressure 112 is a positive air pressure. Thus, the passive valve 108 can be controlled such that as the vacuum pressure 110 increases, the outlet pressure 112 increases. In some implementations, the passive valve 108 is a passive differential valve. FIG. 1 is merely provided as an example. In some implementations, instead of adjusting a valve, the vacuum producing device 102 is adjusted based on the level of the vacuum pressure 110 to maintain a relationship between the vacuum pressure 110 and the outlet pressure 112. Adjusting the vacuum producing device 102 can involve reducing a speed of an impeller of the vacuum producing device 102 to reduce the vacuum pressure 110 and the outlet pressure 112.

Figure 2:
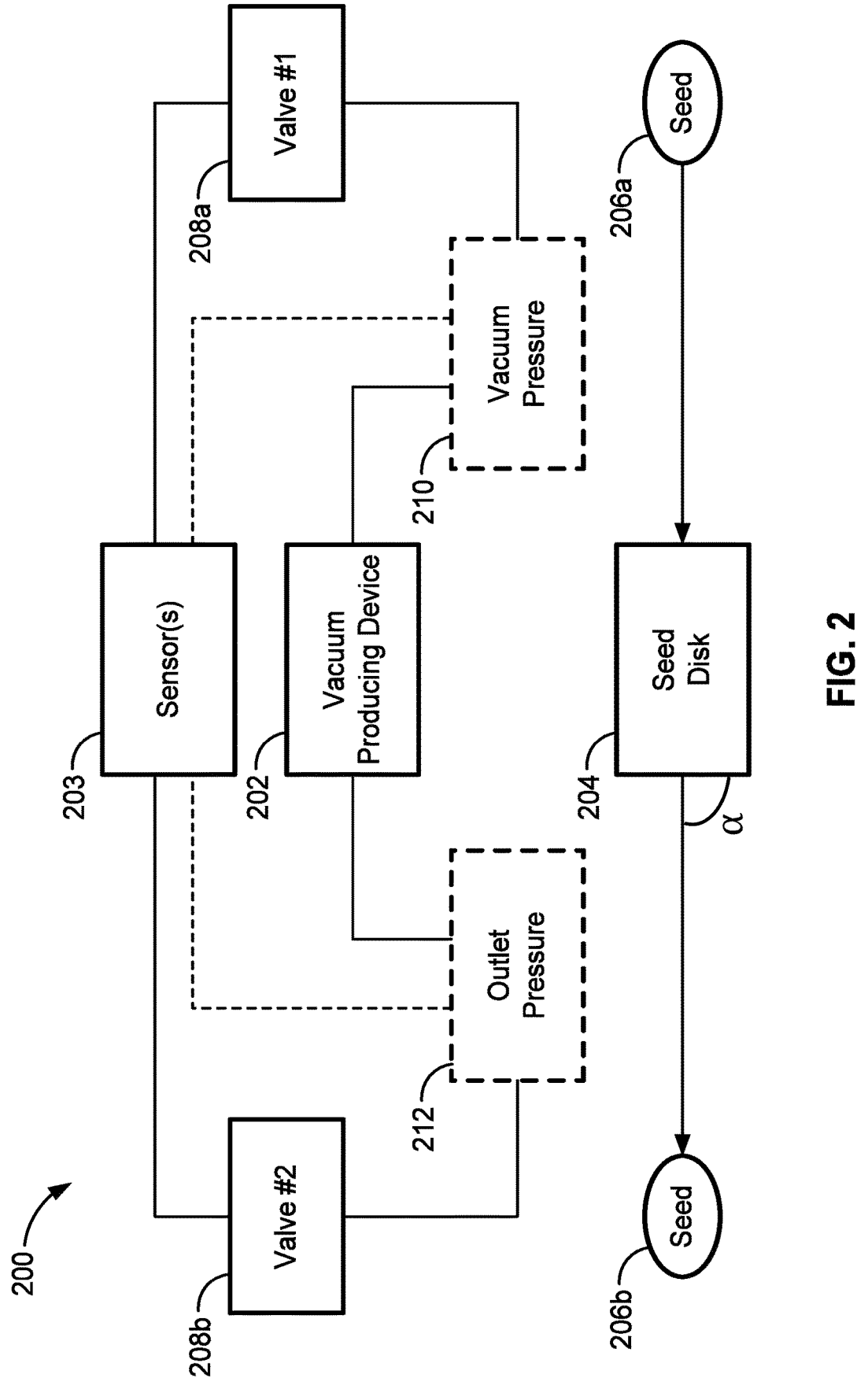
FIG. 2 illustrates a block diagram of a second seed meter, according to some implementations of the present disclosure.

FIG. 2 illustrates a block diagram of a second seed meter 200, according to some implementations of the present disclosure. The seed meter 200 includes a vacuum producing device 202, a seed disk 204, an input side valve 208a, an output side valve 208b, and one or more sensors 203. The seed meter 200 receives a seed at an input side and expels the seed from an output side. In FIG. 2, seed 206a represents the received seed at the input side, and seed 206 represents the expelled seed from the output side. The vacuum producing device 202 generates a vacuum pressure 210 at the input side of the seed meter 200.

Figure 3:
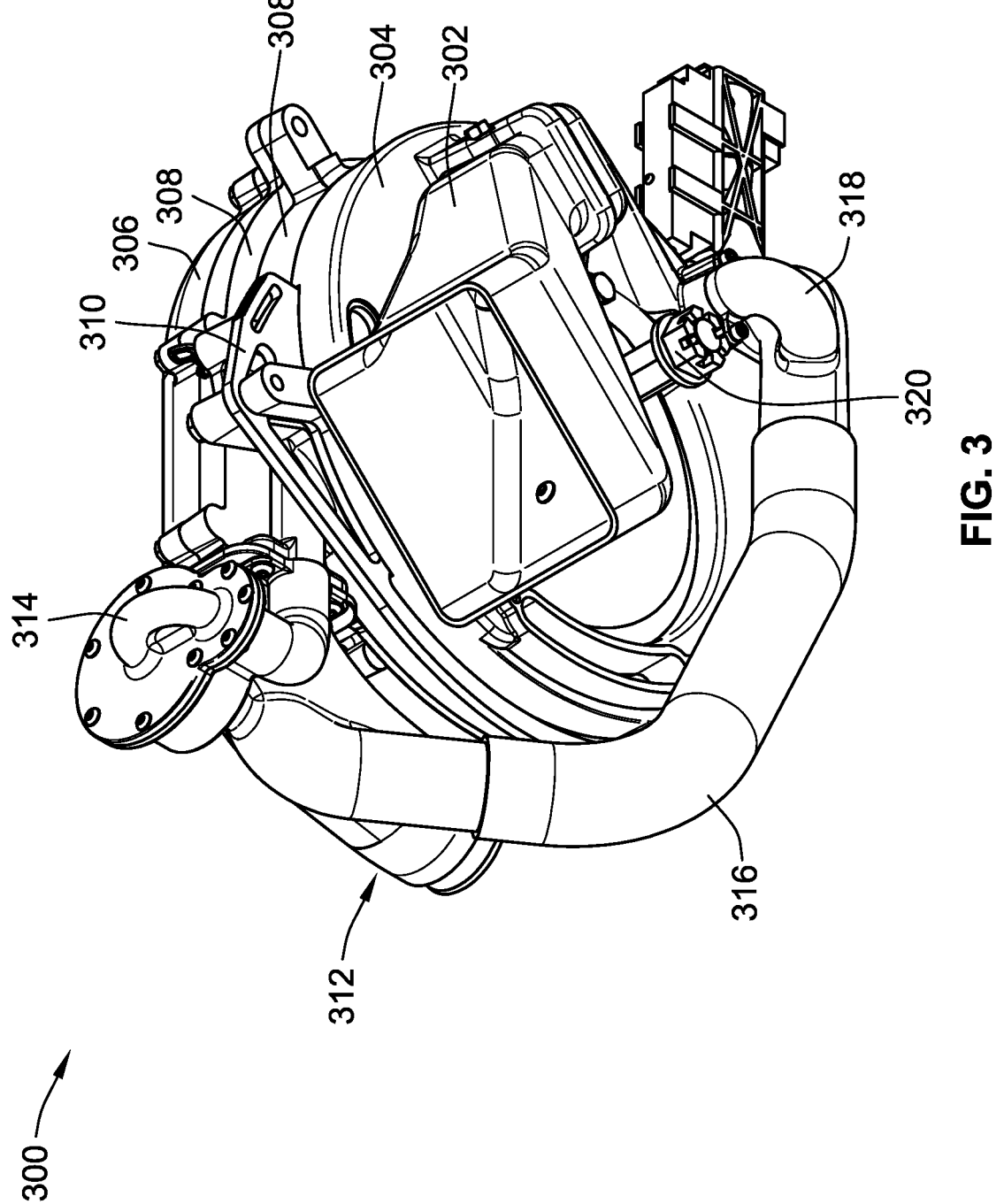
FIG. 3 illustrates a top perspective view of a seed meter, according to some implementations of the present disclosure.

The outlet pressure 212 and the vacuum pressure 210 are similar to or the same as the outlet pressure 112 (FIG. 1) and the vacuum pressure 110 (FIG. 1), respectfully. FIG. 2 provides an alternative to controlling the outlet pressure 212 and the vacuum pressure 210 when compared to the seed meter 100 of FIG. 1. The sensors 203 can include pressure sensors or vacuum sensors for determining at least one of the vacuum pressure 210 and/or the outlet pressure 212. Based on the pressure level of the vacuum pressure 210 recorded by the sensors 203, the valve 208b can be adjusted to modify a level of the outlet pressure 212. Similarly, based on the pressure level of the vacuum pressure 210 recorded by the sensors 203, the valve 208a can be adjusted to modify a level of the vacuum pressure 210. As such, the valves 208a and 208b can be adjusted independently, based on the sensed vacuum pressure 210 and/or the sensed output pressure 212. FIG. 3 provides an example of passive adjustment, according to FIG. 1.

Figure 4:
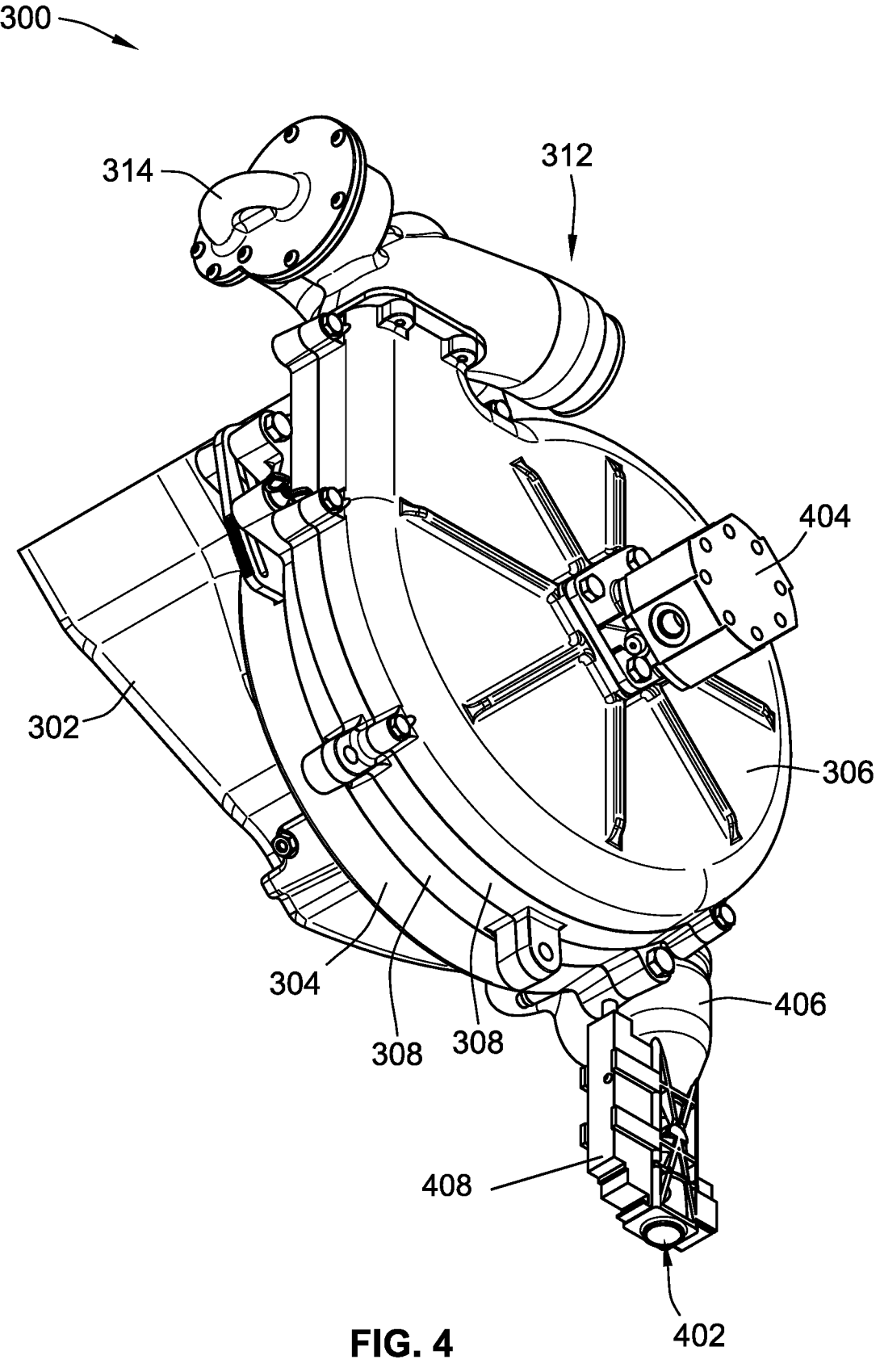
FIG. 4 illustrates a bottom perspective view of the seed meter of FIG. 3.

FIG. 3 illustrates a top perspective view of a seed meter 300, according to some implementations of the present disclosure. FIG. 4 illustrates a bottom perspective view of the seed meter 300 of FIG. 3. The seed meter 300 includes a housing with multiple portions including a seed disk housing portion 304, a compressor housing portion 306, and a mating portion 308. The mating portion 308 matches the compressor housing portion 306 and the seed disk housing portion 308. The seed meter 300 includes a seed hopper 302 coupled to the seed disk housing portion 304. The seed meter 300 includes a singulator 310 that interfaces with a seed disk (not shown), situated between the mating portion 308 and the seed disk housing portion 302.

The seed meter 300 includes an air circuit. The air circuit includes a valve 312 and multiple conduit portions 314, 316, 318. The valve 312 can be a wastegate device. The valve 312 can include a valve rod with a piston that changes position in response to a level of vacuum pressure within the air circuit. The conduit portion 314 connects the valve 312 to the vacuum created within the within the compressor housing portion 306. Via the conduit portion 314, the position of the piston can respond to the level of vacuum pressure. The conduit portion 316 allows air to flow toward an outlet 402 (FIG. 4). The air flowing within the conduit portion 316 toward the outlet 402 (FIG. 4) can be partially diverted into the conduit portion 318. The partially diverted air flowing through the conduit portion 318 is used to jostle, agitate, or stir seeds within a bottom portion of the seed hopper 302.

In some implementations, the seed meter 300 includes a motor 404 (FIG. 4) used to drive an impeller (not shown) within the compressor housing portion 306. The impeller can be powered by hydraulically powered. Rotating the impeller can create the vacuum within the compressor housing portion 306. The vacuum pressure is communicated to the seed disk housing portion 302. The vacuum pressure facilitates loading seed onto the seed disk provided within the seed disk housing portion 302. The vacuum pressure generated is negative air pressure that sucks seed onto the seed disk and prevents the seed on the seed disk from prematurely dislodging.

Rotating the impeller can generate positive air pressure flowing through the conduit 316 at the same time negative air pressure is being generated within the seed disk housing portion 302. The positive air pressure facilitates dislodging seed from the seed disk (not shown). The positive air pressure also guides the seed, after being dislodged, towards the outlet 402 (FIG. 4). Rotating the impeller can be used to create a high level of vacuum for loading seed onto the seed disk and a positive air pressure for guiding or shooting seed out of the outlet 402 (FIG. 4) and into the soil. A venturi device 406 (FIG. 4) is provided for modulating the positive air pressure of the conduit 316 to create a suction force that sucks seed off the seed disk so that the positive air pressure can guide the seed out of the outlet 402 (FIG. 4). In some implementations, a seed sensor 408 (FIG. 4) attaches or is coupled to the outlet 402 (FIG. 4).

The valve 312 can be used to control the positive air pressure generated for guiding the seed out of the outlet 402

5

(FIG. 4). When starting the impeller with no seeds on the seed disk, the vacuum pressure is low (i.e., not much vacuum is produced), and the valve 312 is mostly in an open position. The more positive air pressure created to guide seed out of the outlet 402 (FIG. 4), the less vacuum is produced within the seed disk housing portion 302. Initially, very little vacuum is generated when the seed meter 300 is first turned on. The valve 312 being mostly in the open position will not restrict outward flow of the impeller so that the vacuum pressure can be increased within the seed disk housing portion 302. As seed is loaded in the seed disk such that more holes within the seed disk are covered, the vacuum pressure within the seed disk housing portion 302 increases. This increase forces the valve 312 to move toward a closed position. As the valve 312 moves toward the closed position, the positive air pressure generated within the conduit 316 increases. Thus, a passive valve can be used to control both the negative pressure being generated for loading seed onto the seed disk and the positive pressure being generated for guiding seed out of the outlet 402 (FIG. 4).

Although a passive control is described, in some implementations, a vacuum sensor is included in the seed meter 300. The vacuum sensor can sense the vacuum pressure in the seed disk housing 302. The sensed vacuum pressure can be used to control an active wastegate device. The seed meter 300 includes a seed disk driver 320 for rotating the seed disk. The seed disk driver 320 can be controlled using a gear system (not shown). In some implementations, the seed sensor 408 (FIG. 4) can be used to determine singulation of seed expelled from the outlet 402 (FIG. 4). Based on the singulation, the outlet pressure (or positive pressure) can be increased or decreased. In some implementations, the vacuum pressure can be increased or decreased based on the singulation.

Figure 5:
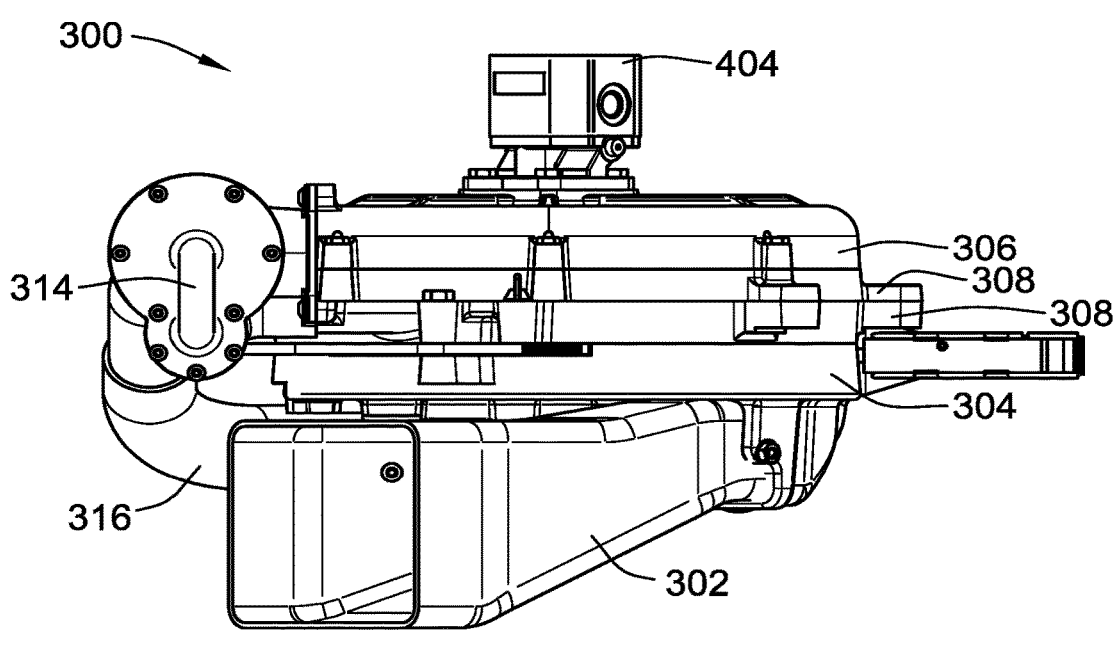
FIG. 5 illustrates a front plan view of the seed meter of FIG. 3.
Figure 6:
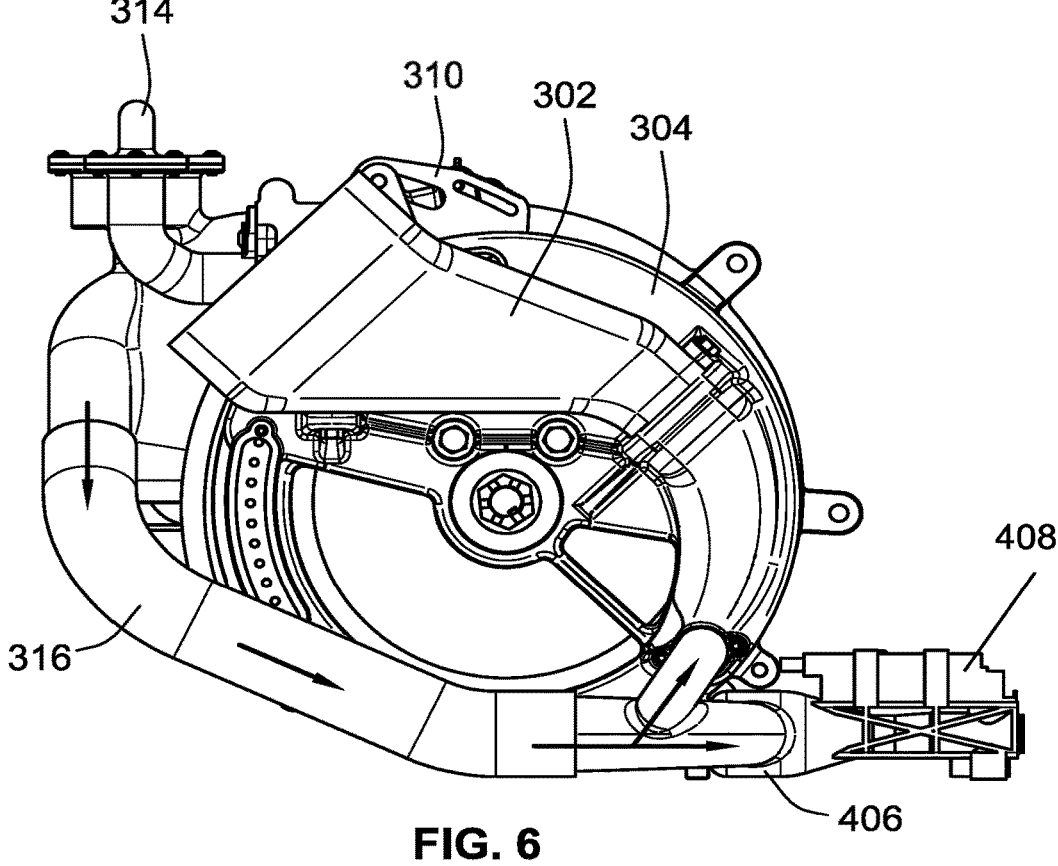
FIG. 6 illustrates a right side view of the seed meter of FIG. 3.
Figure 7:
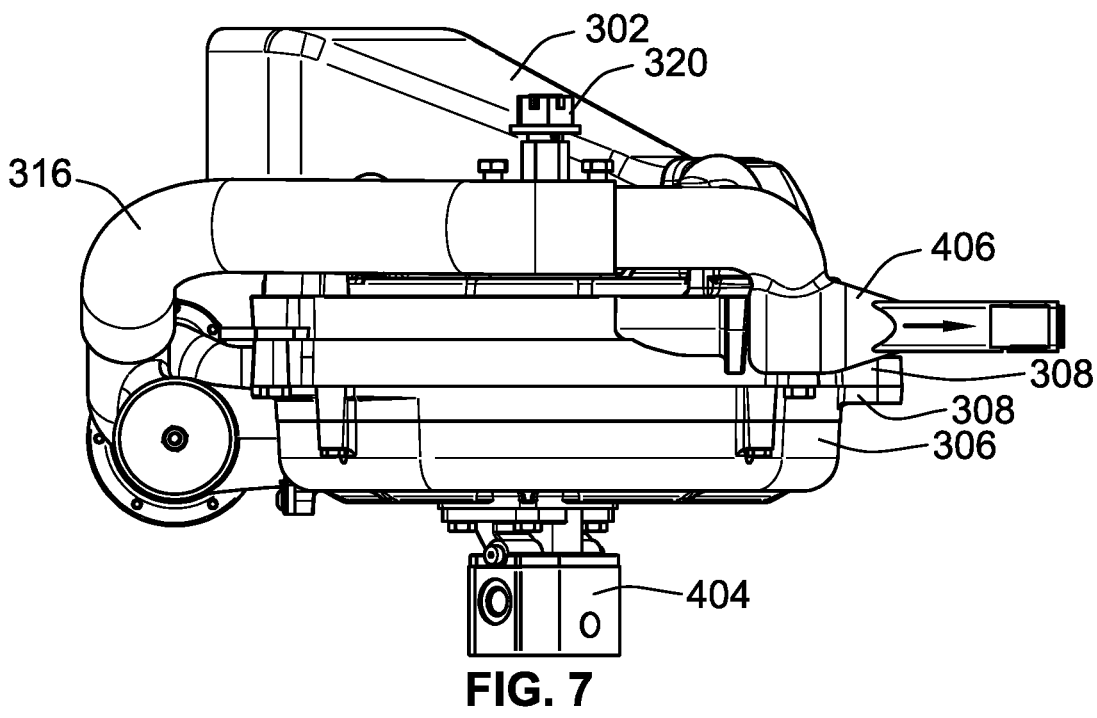
FIG. 7 illustrates a back plan view of the seed meter of FIG. 3.
Figure 8:
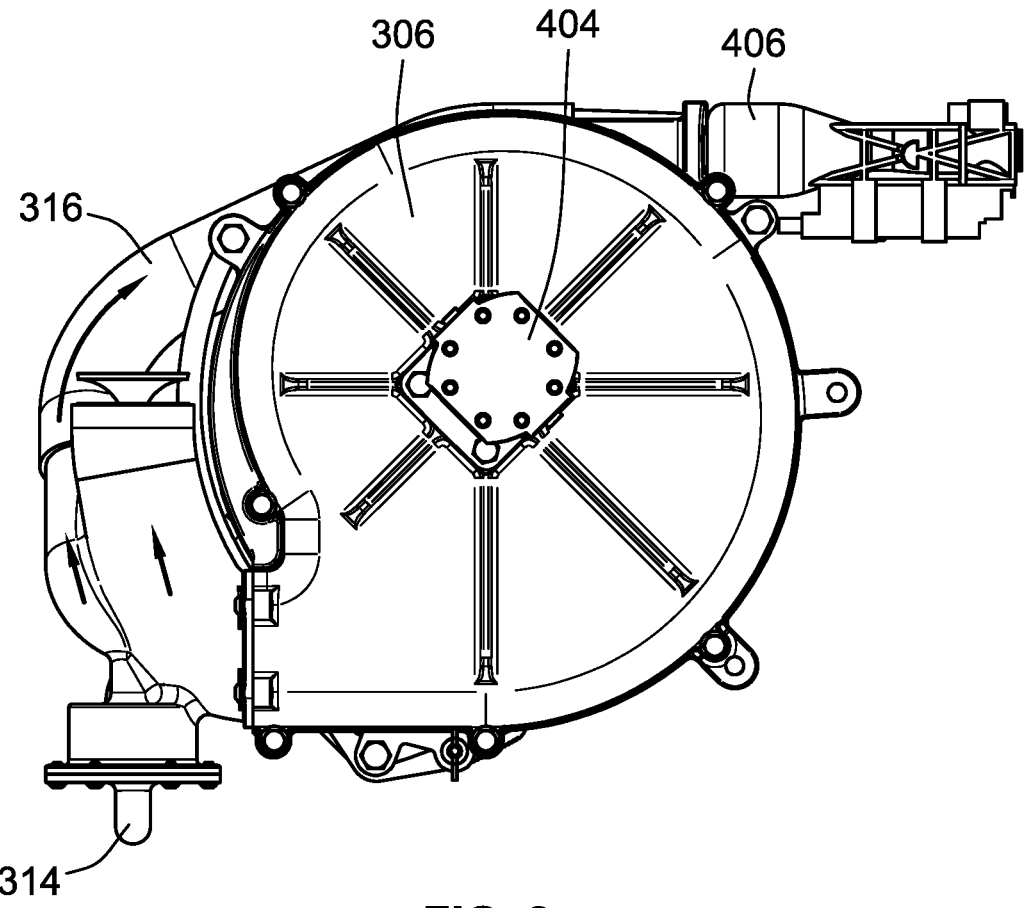
FIG. 8 illustrates a left side view of the seed meter of FIG. 3.
Figure 9:
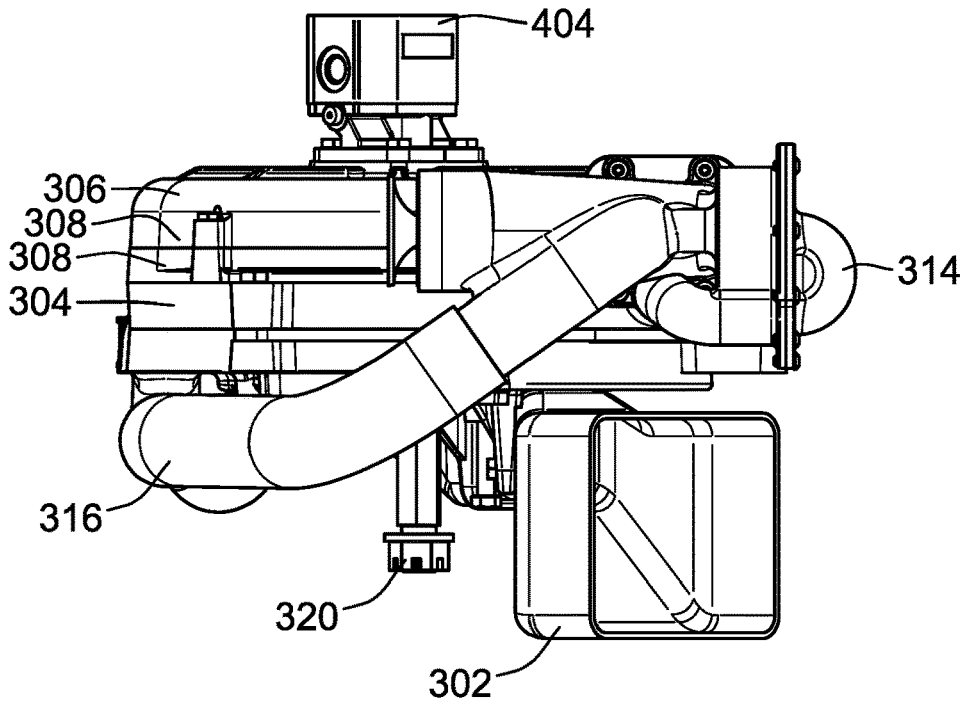
FIG. 9 illustrates a top plan view of the seed meter of FIG. 3.
Figure 10:
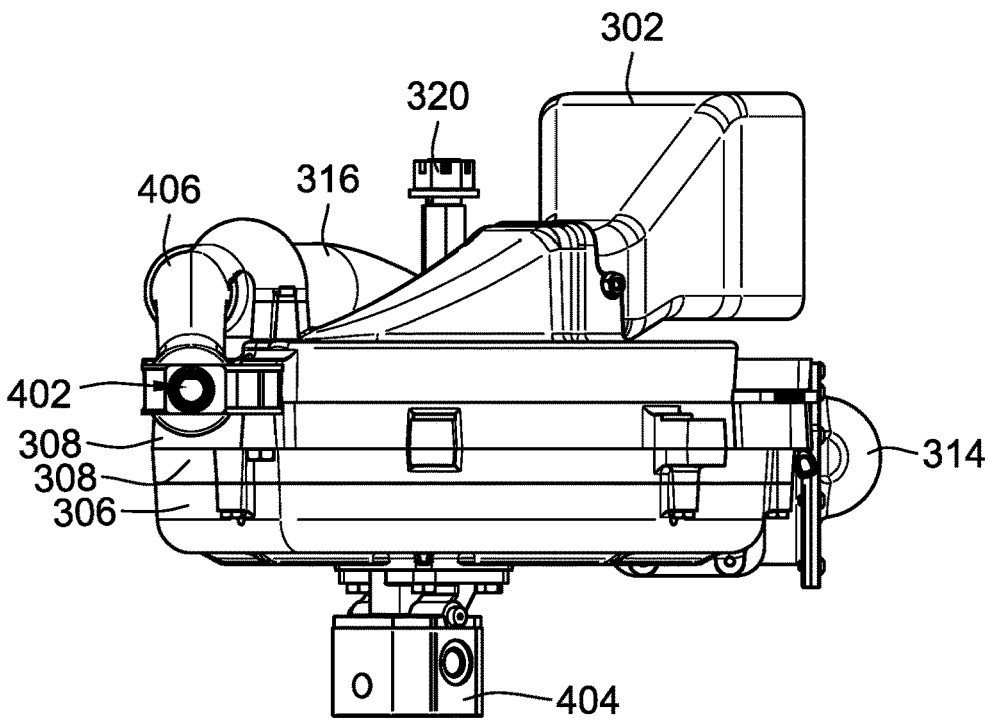
FIG. 10 illustrates a bottom plan view of the seed meter of FIG. 3.

Other views of the seed meter 300 are provided in FIGS. 5 to 10. FIG. 5 illustrates a front plan view of the seed meter 300, FIG. 6 illustrates a right side view of the seed meter 300, FIG. 7 illustrates a back plan view of the seed meter 300, FIG. 8 illustrates a left side view of the seed meter 300, FIG. 9 illustrates a top plan view of the seed meter 300, FIG. 10 illustrates a bottom plan view of the seed meter 300.

Figure 11:
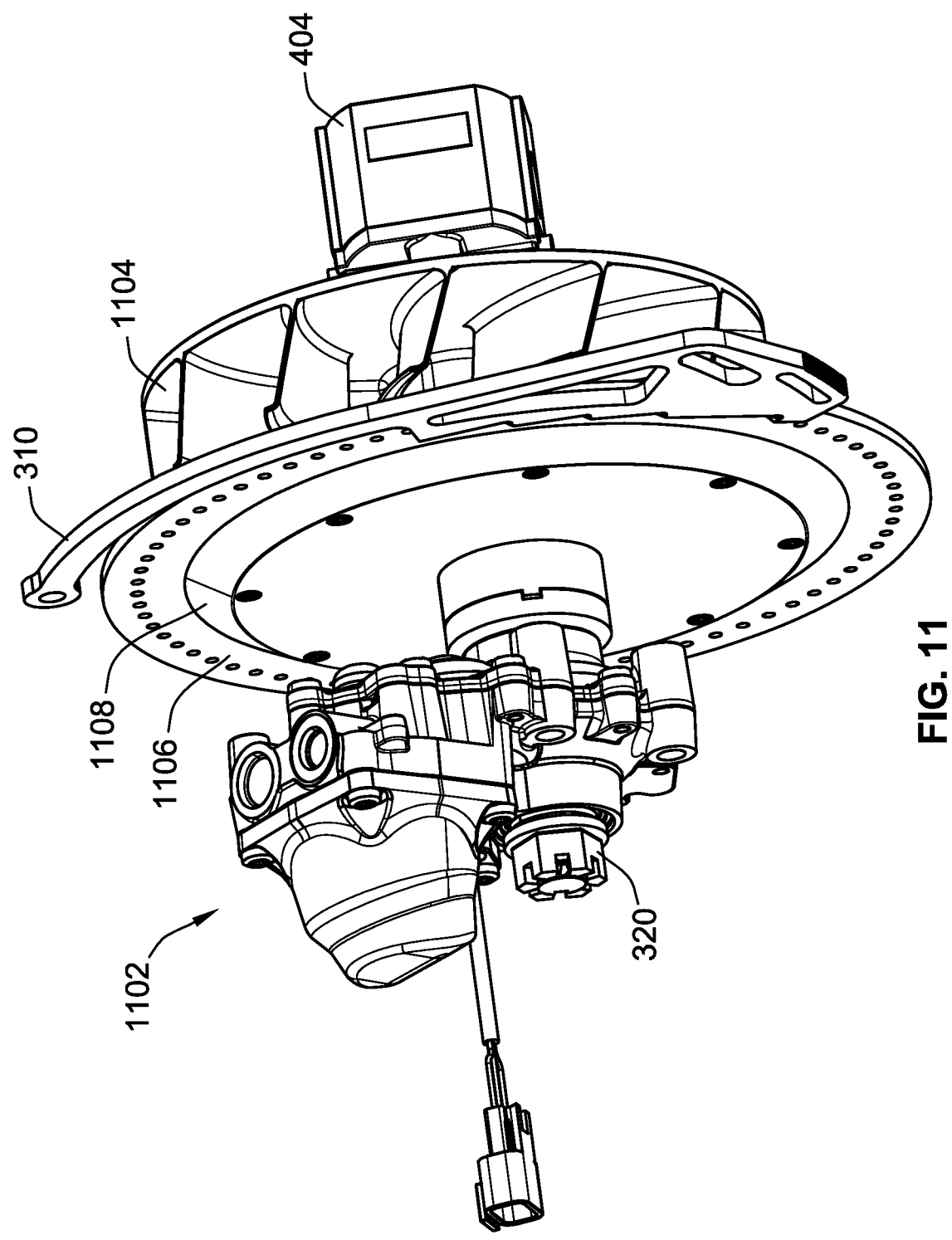
FIG. 11 illustrates a left perspective view of components of the seed meter of FIG. 3 without housing covers, according to some implementations of the present disclosure.
Figure 12:
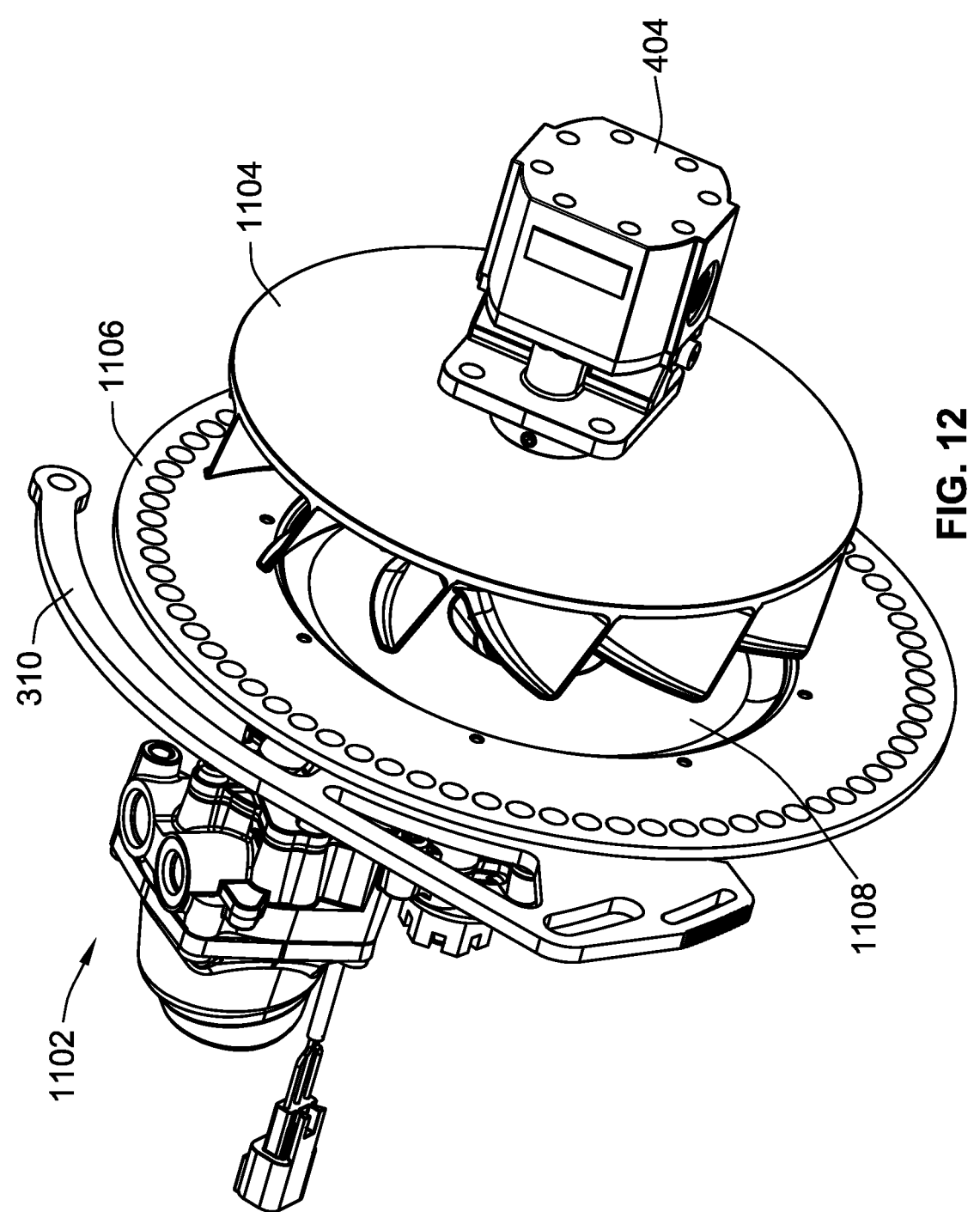
FIG. 12 illustrates a right perspective view of components of the seed meter of FIG. 3 without housing covers, according to some implementations of the present disclosure.
Figure 13:
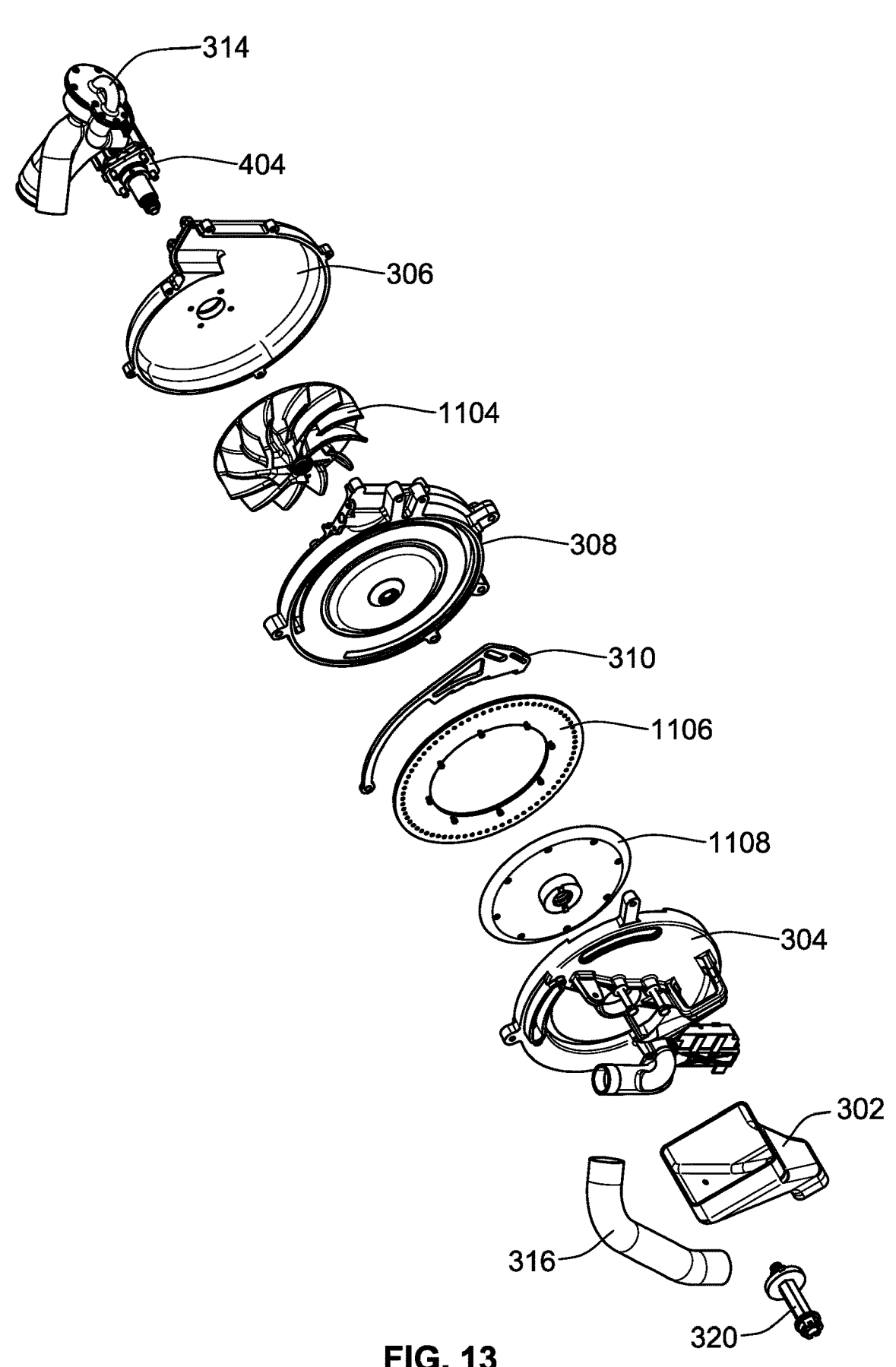
FIG. 13 illustrates components of the seed meter of FIG. 3, according to some implementations of the present disclosure.
Figure 14:
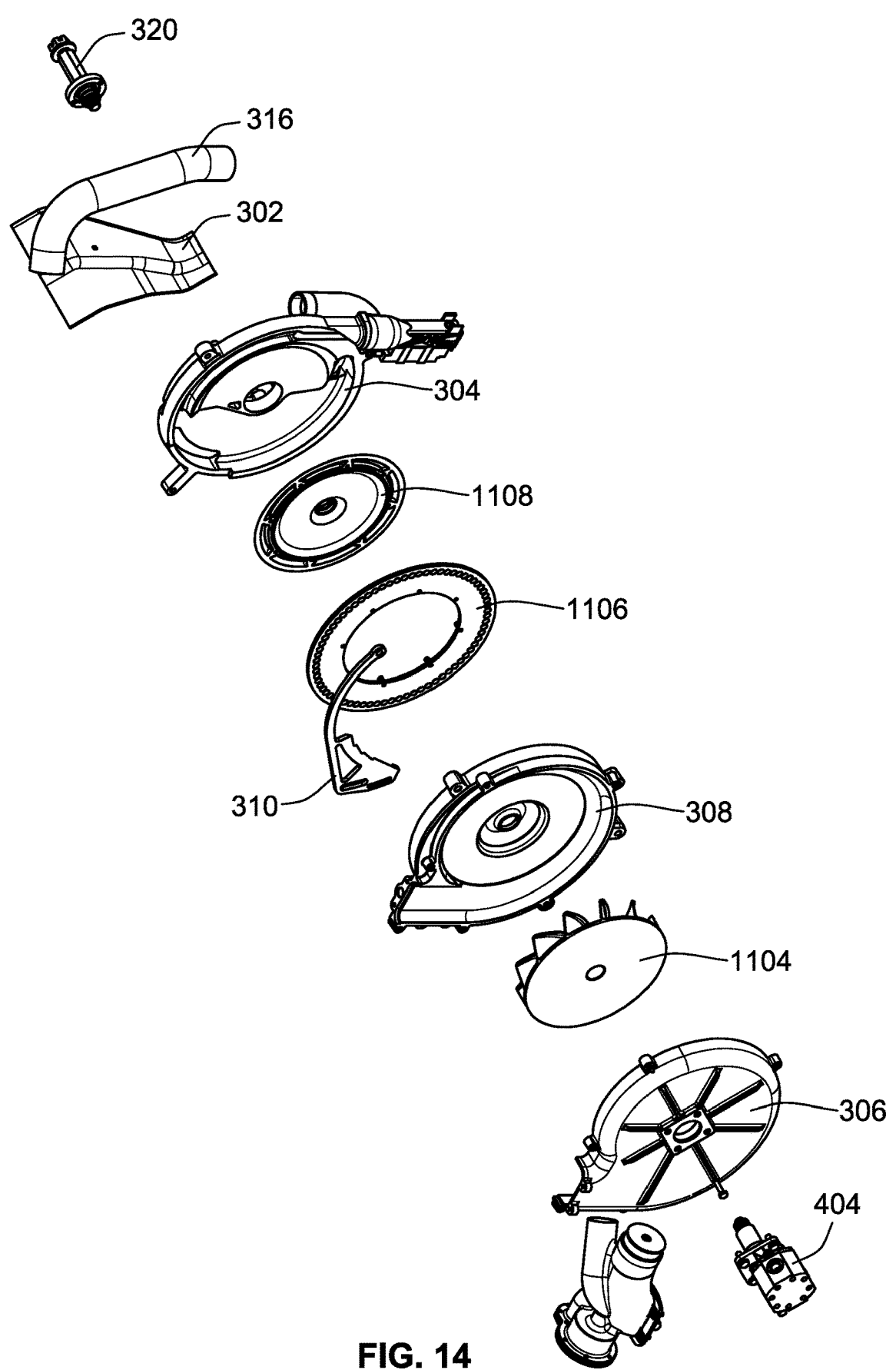
FIG. 14 illustrates components of the seed meter of FIG. 3, according to some implementations of the present disclosure.

FIG. 11 illustrates a left perspective view of components of the seed meter 300 without housing portions (e.g., the seed disk housing portion 304, the compressor housing portion 306, and the mating portion 308), according to some implementations of the present disclosure. FIG. 11 provides an example of an impeller 1104 driven by the motor 404 to generate vacuum and a gear system 1102 for controlling the seed disk driver 320. The seed disk driver 320 is coupled to a seed plate 1108 attached to a seed disk 1106. The seed disk 1106 can include 72 holes. The seed disk 1106 can be used to plant soybeans or corn as such, there is no need to switch between seed disks for different crops. The rotation speed of the seed disk 1106 can be changed to achieve appropriate seed separation for the different crops. FIG. 12 illustrates a right perspective view of component arrangement of FIG. 11. FIGS. 13 and 14 illustrate exploded views of the seed meter 300, according to some implementations of the present disclosure.

Figure 15:
FIG. 15 illustrates a cross section of the seed meter of FIG. 3, according to some implementations of the present disclosure.

FIG. 15 illustrates a cross section of the seed meter 300, according to some implementations of the present disclosure. The venturi 406 can include an inner diameter formed by walls 1502. The walls 1502 are tapered to reduce the inner diameter when moving from the seed disk 1106 toward the outlet 402. Referring to FIG. 6, the conduit 316 provides positive air pressure to the venturi 406. Referring back to

6

FIG. 15, the walls 1502 when encountering the positive air pressure, creates a suction to dislodge a seed at, for example, location 1504.

Seed meters according to some implementations of the present disclosure can be mounted on an agricultural planter. The agricultural planter can include rows of seed meters. At least one of the seed meters can be mounted such that an axis of a respective outlet is positioned between 0 degrees to 90 degrees ($\alpha$) relative to the surface of the farmland on which the agricultural planter sits. The seed meter can be mounted such that the axis of the outlet of the seed meter is at a 45-degree angle ($\alpha$). In some implementations, one or more valves as discussed herein (e.g., the valves 208 *a*, 208 *b*, 312, etc.) can be actively controlled based on a forward operating speed of the agricultural planter.

One or more elements or aspects or steps, or any portion(s) thereof, from one or more of any of claims 1-17 below can be combined with one or more elements or aspects or steps, or any portion(s) thereof, from one or more of any of the other claims 1-17 or combinations thereof, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A seed meter, comprising a seed disk provided in a seed disk housing, a valve and a plurality of conduit portions forming an air circuit within the seed meter, a vacuum producing device coupled to the air circuit and generating a negative vacuum pressure in a first of the plurality of conduit portions leading to the seed disk housing for loading seed onto the seed disk, and an outlet coupled to the seed disk housing, the outlet having a positive outlet pressure in a second of the plurality of conduit portions for ejecting the loaded seed from the seed meter while at the same time generating the negative vacuum pressure, the first conduit portion and the second conduit portion being in fluid communication with one another, the second of the plurality of conduit portions terminating toward the outlet at a bottom of the seed disk housing.

2. The seed meter of claim 1, further comprising a vacuum sensor configured to sense the vacuum pressure in the seed disk housing, wherein the vacuum producing device is adjusted based on the sensed vacuum pressure.

3. The seed meter of claim 1, further comprising an active wastegate device configured to adjust the vacuum pressure and the outlet pressure during ejection of the loaded seed from the seed meter.

4. The seed meter of claim 3, wherein the wastegate device operates in at least two modes, the at least two modes including a first mode where the seed disk is free from seeds and a second mode where the seed disk is filled with seeds, wherein the wastegate device is in a closed position in the first mode and in an open position in the second mode.

5. The seed meter of claim 1, further comprising a passive differential pressure valve configured to adjust the vacuum pressure and the output pressure.

6. The seed meter of claim 1, wherein the vacuum producing device comprises an impeller in a compressor housing, the compressor housing being coupled to the seed disk housing.

7. The seed meter of claim 6, wherein the impeller is hydraulically powered.

8. The seed meter of claim 1, wherein the seed disk includes 72 holes.

9. The seed meter of claim 1, further comprising a gear system configured to rotate the seed disk.

10. The seed meter of claim 9, wherein the seed disk is operable to plant corn and soybeans by changing rotation of the seed disk between corn and soybeans.

11. The seed meter of claim 1, further comprising a venturi configured to create a suction to suck the seed off the seed disk and carry the seed to a furrow.

12. The seed meter of claim 1, wherein each of the negative pressure and the positive pressure is controlled by a valve.

13. The seed meter of claim 12, wherein the valve includes an active wastegate device and a differential pressure valve.

14. The seed meter of claim 1, further comprising a seed hopper coupled to the seed disk housing, wherein a third of the plurality of conduit portions at least partially diverts some of the outlet pressure to a bottom of the seed hopper for stirring seeds at the bottom of the seed hopper.

15. An agricultural planter comprising a plurality of rows of seed meters, each of the seed meters in the plurality of seed meters having:

a seed disk provided in a seed disk housing, a valve and a plurality of conduit portions forming an air circuit within the seed meter, a vacuum producing device coupled to the air circuit and generating a negative vacuum pressure in a first of the plurality of conduit portions leading to a seed disk housing for loading seed onto the seed disk; and an outlet coupled to the seed disk housing, the outlet having a positive outlet pressure in a second of the plurality of conduit portions for ejecting the loaded seed from the seed meter while at the same time generating the negative vacuum pressure, the first conduit portion and the second conduit portion being in fluid communication with one another, the second of the plurality of conduit portions terminating toward the outlet at a bottom of the seed disk housing.

16. The agricultural planter of claim 15, wherein each of the seed meters is mounted such that an axis of a respective outlet is positioned at 45 degrees relative to the ground.

17. The agricultural planter of claim 15, wherein each of the seed meters is mounted such that an axis of a respective outlet is positioned between 0 degrees to 90 degrees relative to the ground.

* * * * *